United States Patent
Ren et al.

(10) Patent No.: US 12,335,175 B2
(45) Date of Patent: Jun. 17, 2025

(54) REFERENCE SIGNAL TRANSMISSION METHOD AND DEVICE

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN); Fangchen Cheng, Beijing (CN); Shilei Zheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 741 days.

(21) Appl. No.: 17/420,647

(22) PCT Filed: Dec. 26, 2019

(86) PCT No.: PCT/CN2019/128530
§ 371 (c)(1),
(2) Date: Jul. 2, 2021

(87) PCT Pub. No.: WO2020/143457
PCT Pub. Date: Jul. 16, 2020

(65) Prior Publication Data
US 2022/0077983 A1 Mar. 10, 2022

(30) Foreign Application Priority Data
Jan. 9, 2019 (CN) .......................... 201910021159.4

(51) Int. Cl.
*H04L 5/00* (2006.01)
*H04L 27/26* (2006.01)
(Continued)

(52) U.S. Cl.
CPC ........ *H04L 5/0048* (2013.01); *H04L 27/2613* (2013.01); *H04W 4/40* (2018.02); *H04W 72/0446* (2013.01)

(58) Field of Classification Search
CPC ............. H04L 5/0048; H04L 27/2613; H04W 72/0446; H04W 4/40
See application file for complete search history.

(56) References Cited

U.S. PATENT DOCUMENTS

2014/0198872 A1  7/2014  Barriac et al.
2016/0157287 A1* 6/2016  Chae ................ H04L 27/26136
                                                370/329
(Continued)

FOREIGN PATENT DOCUMENTS

CN  108307535 A     7/2018
CN  109391403 A  *  2/2019  ........... H04L 1/0071
(Continued)

OTHER PUBLICATIONS

First Office Action for Japanese Patent Application No. 2021-539877, issued on Jun. 28, 2022, and its English Translation provided by Google Translate.
(Continued)

*Primary Examiner* — Muthuswamy G Manoharan
(74) *Attorney, Agent, or Firm* — Ladas & Parry LLP

(57) ABSTRACT

A reference signal transmission method and a reference signal transmission device are provided. The reference signal transmission method for a V2X system includes: receiving, by a first device, a first reference signal transmitted by another device via a sidelink; and performing, in accordance with the first reference signal transmitted by the other device, at least two of: a resource occupancy sensing process, an Automatic Gain Control (AGC) process, a Frequency Offset Estimation (FOE) process, a Channel State
(Continued)

Information (CSI) measurement process, and a channel estimation process.

20 Claims, 7 Drawing Sheets

(51) Int. Cl.
  *H04W 4/40* (2018.01)
  *H04W 72/04* (2023.01)
  *H04W 72/0446* (2023.01)

(56) References Cited

U.S. PATENT DOCUMENTS

| | | | |
|---|---|---|---|
| 2017/0111204 A1* | 4/2017 | Chang | H04L 5/0048 |
| 2018/0198659 A1 | 7/2018 | Ko et al. | |
| 2018/0302202 A1* | 10/2018 | Kim | H04L 5/0048 |
| 2019/0200377 A1 | 6/2019 | Li et al. | |
| 2020/0403747 A1 | 12/2020 | Zhao et al. | |
| 2021/0203455 A1* | 7/2021 | Zhang | H04W 56/001 |
| 2021/0258923 A1* | 8/2021 | Kakishima | H04W 56/005 |
| 2021/0288853 A1* | 9/2021 | Sundberg | H04W 72/0446 |
| 2023/0139455 A1* | 5/2023 | Chatterjee | H04W 72/23 370/329 |

FOREIGN PATENT DOCUMENTS

| | | | |
|---|---|---|---|
| JP | 2016510538 A | 4/2016 | |
| WO | 2018171481 A1 | 9/2018 | |
| WO | WO-2019047090 A1 * | 3/2019 | H04L 5/00 |

OTHER PUBLICATIONS

"Discussion on physical layer structure in NR V2X" 3GPP TSG RAN WG1 Meeting #95, R1-1812617, Spokane, USA, Nov. 12-16, 2018, all pages.

"Physical layer structure for NR-V2X" 3GPP TSG RAN WG1 Meeting #95, R1-1812810, Spokane, USA, Nov. 12-16, 2018, all pages.

Nokia, Alcatel-Lucent Shanghai Bell, "Evaluations of DMRS Enhancement for PSCCH and PSSCH", R1-165041, 3GPP TSG RAN WG1 Meeting #85, Nanjing, China May 23-27, 2016, all pages.

Nokia, Nokia Shanghai Bell, "Discussions on NR V2X Sidelink Physical Layer Structures and Procedures", R1-1811427, 3GPP TSG RAN WG1 Meeting #94bis, Chengdu, China, Oct. 8-12, 2018, all pages.

Qualcomm Incorporated, "Considerations on Physical Layer aspects of NR V2X", R1-1813421, 3GPP TSG RAN WG1 Meeting #95, Spokane, USA, Nov. 12-16, 2018, all pages.

Extended European Search Report from EP app. No. 19908567.1, dated Jan. 20, 2022, all pages.

Second Office Action for corresponding European Patent Application No. 19908567.1 issued on Mar. 22, 2023.

"Discussion on Reference Signal for Sidelink Control and Data Channel Design," 3GPP TSG RAN WG1 Meeting #95, R1-1812207, Agenda Item: 7.2.4.1.5, Spokane, USA, Nov. 12-16, 2018, all pages.

Summons to attend oral proceedings pursuant to Rule 115(1) EPC from corresponding European Patent Application No. 19908567.1 dated Mar. 6, 2024.

CATT: "PSSCH/PSBCH decoding issue", 3GPP Draft; R1-1608714, 3rd Generation Partnership Project (3GPP), Mobile Competence Centre; 650, Route Des Lucioles; F-06921 Sophia-Antipolis Cedex; France, vol. RAN WGI , No Lisbon, Portugal; Oct. 10, 2016-Oct. 14, 2016 Oct. 1, 2016 (Oct. 1, 2016), XP051159061, Retrieved from the Internet: URL:http://www.3gpp.org/ftp/tsg_ran/WG1_RL1/TSGRI 86b/Docs/ [retrieved on Oct. 1, 2016].

Ericsson: "Link level evaluations of Nr Pssch", 3GPP Draft; R1-1813644 Ericsson—Link Level Evaluations of NR PSSCH, 3rd Generation Partnership Project (3GPP), Mobile Competence Centre; 650, Route Des Lucioles; F-06921 Sophia-Antipolis Cedex; France, vol. RAN WGI, No Spokane, WA, US; Nov. 12, 2018-Nov. 16, 2018 Nov. 11, 2018 (Nov. 11, 2018), XP051555702.

Office action from corresponding Korean Patent Application No. 10-2021-7023994 dated Apr. 25, 2024 with its English translation.

OPPO, R1-1810985, "discussion of physical layer structure and procedure for NR-V2X", 3GPP TSG RAN WG1 #94bis, 3GPP server publication date (Sep. 29, 2018), Chengdu, China.

First Office Action issued by the Taiwanese Patent Office for Taiwanese Patent Application 108148353, mailed on Nov. 12, 2020 and its English Translation, all pages.

Third Japanese Office Action for the corresponding Japanese Patent Application No. 2021-539877 issued by the Japanese Patent Office on Aug. 1, 2023, and its English translation provided by the foreign associate.

"Discussion on Reference Signal for Sidelink Control and Data Channel Design," 3GP TSG RAN WG1 Meeting #94bis, Chengdu, China, Oct. 8-12, 2018, R1-1810710, Agenda Item: 7.2.4.1.5, Source: Huawei, HiSilicon, all pages.

\* cited by examiner

REFERENCE SIGNAL TRANSMISSION METHOD AND DEVICE

CROSS-REFERENCE TO RELATED APPLICATION

This application is the U.S. national phase of PCT Application No. PCT/CN2019/128530 filed on Dec. 26, 2019, which claims a priority of the Chinese patent application No. 201910021159.4 filed in China on Jan. 9, 2019, the entire contents of which are incorporated herein by reference.

TECHNICAL FIELD

Embodiments of the present disclosure relates to the field of communication technology, in particular to a reference signal transmission method and a reference signal transmission device.

BACKGROUND

In a Long Term Evolution (LTE) Vehicle-to-Everything (V2X) technology in related art (Rel-14/Rel-15 LTE V2X technology), a time length adopted by a User Equipment (UE) for Automatic Gain Control (AGC) or Guard Period (GP) is fixed as one symbol, so as to achieve the adjustment of the signal power for Analog-to-Digital Conversion (ADC) and achieve the conversion between transmission and reception. A Demodulation Reference Signal (DMRS) for data demodulation also occupies four symbols within one subframe, and an overhead for the reference signal is relatively high. Along with the emergence of $5^{th}$-Generation (5G) New Radio (NR), an Internet of Vehicle technology has been further developed to meet the requirements in new application scenarios.

The 5G NR supports a configuration of a flexible subcarrier spacing, which raises a new challenge for the design of an NR V2X physical layer structure. It is probably impossible for the AGC or the GP which occupies one symbol to meet the requirements, so it is necessary to re-design them. In the LTE V2X, a broadcasting or multicasting mode, rather than a unicasting mode, is provided. In order to meet the requirements on NR V2X unicasting communication, it is necessary to perform, in the NR V2X, UE-based resource occupancy sensing, frequency offset estimation, channel measurement, channel estimation, etc. In other words, each UE needs achieve such functions as resource occupancy sensing, frequency offset estimation and channel measurement through signals or channels which may be differentiated from each other, while preventing the performance from being deteriorated due to a collision among the signals or channels for the UEs. In this regard, many new signals or channels need to be introduced to meet the above requirements, leading to an increase in the system design complexity as well as the signaling overhead.

FIG. 1 shows a subframe structure of a V2X sidelink in the $3^{rd}$-Generation Partnership Project (3GPP) R15, where an x-axis represents a time domain with each column representing an Orthogonal Frequency Division Multiplexing (OFDM) symbol, and a y-axis represents a frequency domain. A first OFDM symbol within the subframe is fixedly occupied by the AGC, and a last OFDM symbol is fixedly occupied by the GP, and the other symbols therebetween are used for data or DMRS. As shown in FIG. 1, for 14 symbols within one subframe, totally 6 symbols are occupied by the AGC, the GP and the DMRS, and merely 8 symbols are left for the data transmission. In the NR V2X, in order to support the newly-introduced unicasting communication mode between UEs, it is necessary to perform the resource occupancy sensing, the frequency offset estimation, the channel measurement, the channel estimation, etc., so many new signals or channels need to be introduced to meet the above requirements, leading in an increase in the system design complexity as well as the signaling overhead.

SUMMARY

An object of the present disclosure is to provide a reference signal transmission scheme, so as to achieve at least two of such functions as resource occupancy sensing, AGC measurement, frequency offset estimation, channel state information measurement and channel estimation through an individual signal, thereby to reduce the V2X system design complexity as well as the signaling overhead.

In one aspect, the present disclosure provides in some embodiments a reference signal transmission method for a V2X system, including:
  receiving, by a first device, a first reference signal transmitted by another device via a sidelink; and
  performing, in accordance with the first reference signal transmitted by the other device, at least two of: a resource occupancy sensing process, an Automatic Gain Control (AGC) process, a Frequency Offset Estimation (FOE) process, a Channel State Information (CSI) measurement process, and a channel estimation process.

In another aspect, the present disclosure provides in some embodiments a first device in a V2X system, including a transceiver, a memory, a processor, and a computer program stored in the memory and executable by the processor, wherein
  the transceiver is configured to receive a first reference signal transmitted by another device via a sidelink;
  the processor is configured to read the computer program in the memory to: perform, in accordance with the first reference signal transmitted by the other device, at least two of: a resource occupancy sensing process, an AGC process, a FOE process, a CSI measurement process, and a channel estimation process.

In yet another aspect, the present disclosure provides in some embodiments a first device, including:
  a signal reception unit configured to receive a first reference signal transmitted by another device via a sidelink; and
  a signal processing unit configured to perform, in accordance with the first reference signal transmitted by the other device, at least two of: a resource occupancy sensing process, an AGC process, a FOE process, a CSI measurement process, and a channel estimation process.

In still yet another aspect, the present disclosure provides in some embodiments a computer-readable storage medium storing therein an instruction. When the instruction is executed by a computer, the above-mentioned method is implemented by the computer.

According to the reference signal transmission method in the embodiments of the present disclosure, it is able to achieve various functions through the reference signal, thereby to reduce the V2X system design complexity as well as the signaling overhead. In addition, it is able to reduce a waste of time/frequency resources, thereby to improve a block error rate (BER) for the sidelink data transmission as well as the resource utilization.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

FIG. 6 is another schematic view showing the transmission of the reference signals in a distributed mapping mode according to an embodiment of the present disclosure;

FIG. 7 is yet another schematic view showing the transmission of the reference signals in a distributed mapping mode according to an embodiment of the present disclosure;

DETAILED DESCRIPTION

Figure 1:
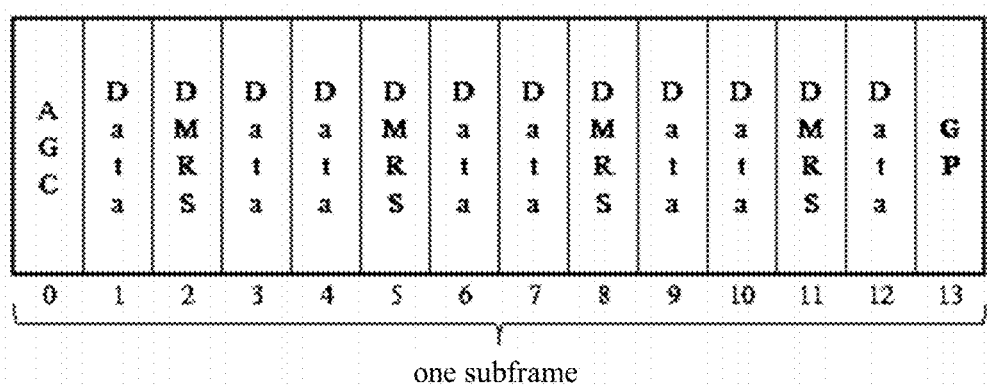
FIG. 1 is a schematic view showing a subframe structure for a V2X sidelink in the related art.

Hereinafter, exemplary embodiments of the present disclosure will be described in more detail with reference to the accompanying drawings. Although the drawings show exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the scope of the present disclosure to a person skilled in the art.

Such words as "first" and "second" involved in the specification and the appended claims are merely used to differentiate similar objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" in the specification and the appended claims is used to represent at least one of listed objects.

The technology described in the context shall not be limited to a Long Term Evolution (LTE)/LTE-Advanced (LTE-A) system and an NR system, and it may also be applied to various wireless communication systems, e.g., Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), or any other system. The terms "system" and "network" may be replaced with each other. The CDMA system may be used to implement such radio technologies as CDMA2000 and Universal Terrestrial Radio Access (UTRA). The UTRA may include Wideband Code Division Multiple Access (WCDMA) and the other CDMA variants. The TDMA system may be used to implement such a radio technology as Global System for Mobile Communication (GSM). The OFDMA system may be used to implement such radio technologies as Ultra Mobile Broadband (UMB), Evolved-UTRA (E-UTRA), IEEE 1102.11 (Wireless Fidelity (Wi-Fi)), IEEE 1102.16 (WiMAX), IEEE 1102.20, and Flash-OFDM. The UTRA and the E-UTRA are parts of a Universal Mobile Telecommunications System (UMTS). The LTE and a more advanced LTE (e.g., LTE-A) are new UMTS versions using the E-UTRA. The UTRA, E-UTRA, UMTS, LTE, LTE-A and GSM have been described in literatures from the $3^{rd}$-Generation Partnership Project (3GPP). The CDMA2000 and the UMB have been described in literatures from the $3^{rd}$-Generation Partnership Project 2 (3GPP2). The technology described in the context may be applied to the above-mentioned systems and radio technologies, or applied to the other systems and radio technologies. However, the NR system has been described illustratively hereinafter, and terms for the NR system have been used in most of the description, although these technologies may also be applied to the systems other than the NR system.

The following description is given for illustrative purposes but shall not be construed as limiting the scope, applicability or configuration set forth in the appended claims. Any alterations may be made on functions and arrangements of the discussed elements without departing from the spirit and scope of the present disclosure. Various procedures or assemblies may be omitted, replaced or added appropriately in the examples. For example, steps of the described method may be performed in an order different from that described in the context, and some steps may be added, omitted or combined. In addition, the features described with reference to some examples may be combined in the other examples.

The present disclosure provides in some embodiments a method for transmitting a Multi-Purpose Reference Signal (MP-RS) for a sidelink. As compared with the technology in the related art, the MP-RS may be transmitted before the transmission of Scheduling Assignment (SA) or Data, and this reference signal has a flexible duration and a flexible Sub-Carrier Spacing (SCS). Through an individual signal, it is able to achieve such functions as resource occupancy sensing, AGC, Frequency Offset Estimation (FOE), Channel State Information-Reference Signal (CSI-RS) measurement and channel estimation (e.g., DMRS estimation), thereby to prevent a waste of time/frequency resources, and improve the BER for the sidelink data transmission as well as the resource utilization.

The present disclosure provides in some embodiments a reference signal, which is specifically a reference signal capable of achieving various functions, i.e., capable of achieving at least two of such functions as resource occupancy sensing, AGC, FOE, CSI-RS measurement and channel estimation (e.g., DMRS estimation).

Figure 2:
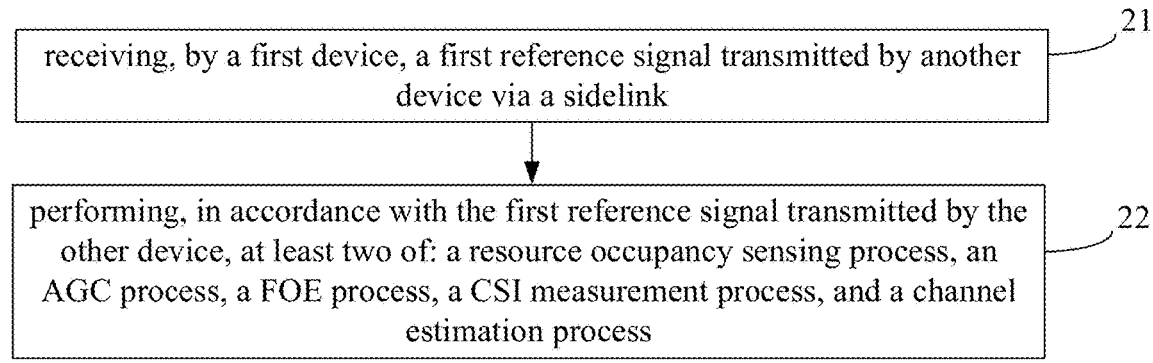
FIG. 2 is a flow chart of a reference signal transmission method according to an embodiment of the present disclosure.

As shown in FIG. 2, the present disclosure provides in some embodiments a reference signal transmission method for a V2X system, which includes the following steps.

Step 21: receiving, by a first device, a first reference signal transmitted by another device via a sidelink.

Here, the other device may be any device in the V2X system other than the first device. The first device may communicate with the other device via the unicasting sidelink. For example, the first device may receive the first reference signal from the other device via the unicasting sidelink, or transmit a second reference signal to the other device via the unicasting sidelink.

Step 22: performing, in accordance with the first reference signal transmitted by the other device, at least two of: a resource occupancy sensing process, an AGC process, a FOE process, a CSI measurement process, and a channel estimation process.

In order to reduce the system design complexity as well as the signaling overhead, in the embodiments of the present disclosure, various functions, e.g., at least two of the resource occupancy sensing process, the ACG process, the FOE process, the CSI measurement process and the channel estimation process, may be achieved through the first reference signal. The implementation of these functions will be described hereinafter in conjunction with the embodiments.

Based on the above steps, the functions of the reference signal in the V2X system of the related art have been expanded in the embodiments of the present disclosure, so as to achieve at least two of the above functions and prevent the introduction of too many new signals or channels into the system to support the unicasting communication mode between devices, thereby to reduce the system design complexity as well as the signaling overhead.

In the embodiments of the present disclosure, the first device may receive the first reference signal transmitted by the other device in Step 21 via the sidelink, or transmit a reference signal to a certain other device (e.g., a second device) via the sidelink. For example, the reference signal transmission method may further include:

Step 23 of transmitting, by the first device, the second reference to the second device. The second reference signal may be used by the second device to perform at least two of resource occupancy sensing process, ACG process, FOE process, CSI measurement process and channel estimation process.

Here, there is no strict sequential order between Step 23 and Steps 21-22.

In a possible embodiment of the present disclosure, prior to transmitting the second reference signal in Step 23, the first device may further determine a signal parameter of the second reference signal in accordance with a device feature of the first device. The device feature may include a device Identity (ID) and/or a UE group to which the device belongs. The signal parameter may include at least one of a first sequence adopted by the first reference signal, a Cyclic Shift (CS) value of the first sequence, and a frequency-domain position to which the first reference signal is mapped.

In addition, in the embodiments of the present disclosure, the second reference signal may be subjected to Inverse Fast Fourier Transform (IFFT), so as to be switched from a frequency domain to a time domain and form a plurality of repeating signals in the time domain. At least one of repeating signal in the second reference signal may be used by the second device to perform the ACG process, and apart from the at least one repeating signal, the other repeating signals may be used by the second device to perform at least one of the resource occupancy sensing process, FOE process, CSI measurement process and channel estimation process. When transmitting the second reference signal, the first device may determine a first quantity of symbols of a first kind for the ACG in the second reference signal in accordance with an SCS adopted by the second reference signal, and perform frequency-domain discrete mapping and IFFT on a sequence of the second reference signal, so as to acquire and transmit the second reference signal.

Features of the reference signals (for example, the first reference signal and the second reference signal mentioned hereinabove) adopted in the embodiments of the present disclosure will be described hereinafter in details. Unless otherwise specified, the reference signal in the context refers to a reference signal capable of achieving at least two of the above functions.

(1) The reference signal in the embodiments of the present disclosure may be an M sequence or a Zadoff-Chu (ZC) sequence having a predetermined length, and it may occupy an entirety or a part of a system operating bandwidth in the frequency domain and occupy at least one symbol in the time domain.

In other words, in the embodiments of the present disclosure, a length of the sequence of the reference signal may occupy an entirety of a system operating bandwidth or a part of the system operating bandwidth in the frequency domain, and occupy at least one symbol in the time domain. The entire operating bandwidth may be a preconfigured Bandwidth Part (BWP).

(2) In the embodiments of the present disclosure, there is a correspondence between signal parameters of the reference signal and device groups or devices. The signal parameters may include a sequence adopted by the first reference signal, a CS value of the sequence and a frequency-domain position, and a same first reference signal may be multiplexed by a plurality of devices.

In other words, in the embodiments of the present disclosure, the devices (UEs) or device groups (UE groups) may be differentiated from each other through different sequences, different CS values of a same sequence or different frequency-domain positions of the reference signal (the same reference may be multiplexed by the UEs).

(3) Distributed mapping: in the embodiments of the present disclosure, the reference signals may be mapped to an entirety of a system operating bandwidth in the frequency domain in a comb-type mapping mode, and different devices may occupy different comb tooth positions.

Figure 3:
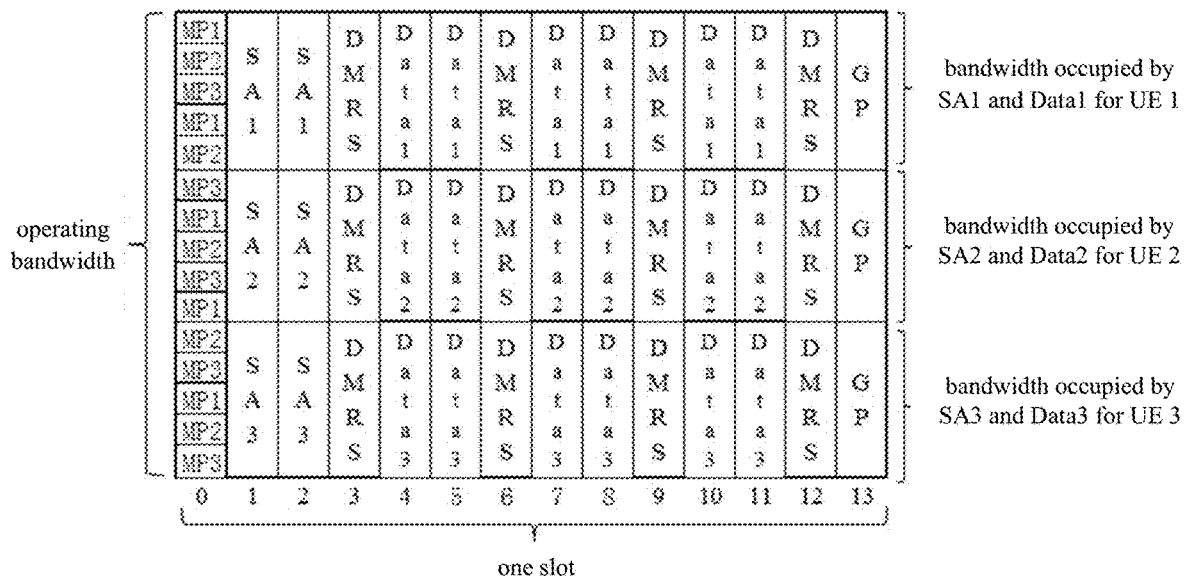
FIG. 3 is a schematic view showing an instance of distributed mapping of reference signals according to an embodiment of the present disclosure.

FIG. 3 shows an instance of the distributed mapping of the reference signals. A reference signal MP1 for a UE 1 is mapped to an entirety of a system operating bandwidth, a reference signal MP2 for a UE 2 is also mapped to an entirety of a system operating bandwidth, and a reference signal MP3 for a UE 3 is also mapped to an entirety of a system operating bandwidth. In addition, the reference signals for the UEs may occupy different comb tooth positions respectively.

FIG. 3 is a schematic view showing a reference signal transmission mode with the SCS of the reference signal as 30 KHz. In FIG. 3, each small block represents one symbol in the time domain and one subcarrier in the frequency domain. As shown in FIG. 3, because the SCS is 30 KHz and a duration of the symbol is relatively long, the AGC may be performed merely through the reference signal on one symbol. The reference signal on a first symbol (e.g., MP1 to MP3) may be mapped to an entirety of a system operating bandwidth in a comb-type mapping mode. Apart from the AGC process, the reference signal may also be used to perform the CSI measurement and the resource occupancy sensing on a unicasting communication link before the communication, and perform channel estimation and FOE on SA and Data on symbols #1 and #2 during the communication. In this way, it is able to achieve various functions through the reference signal, thereby to improve a BER for the sidelink data transmission as well as the resource utilization.

(4) Centralized mapping: in the embodiments of the present disclosure, the reference signal may also be mapped to a part of the operating bandwidth in the frequency domain in a continuous mapping mode, and different devices (UEs) may occupy different positions in the BWP.

Figure 4:
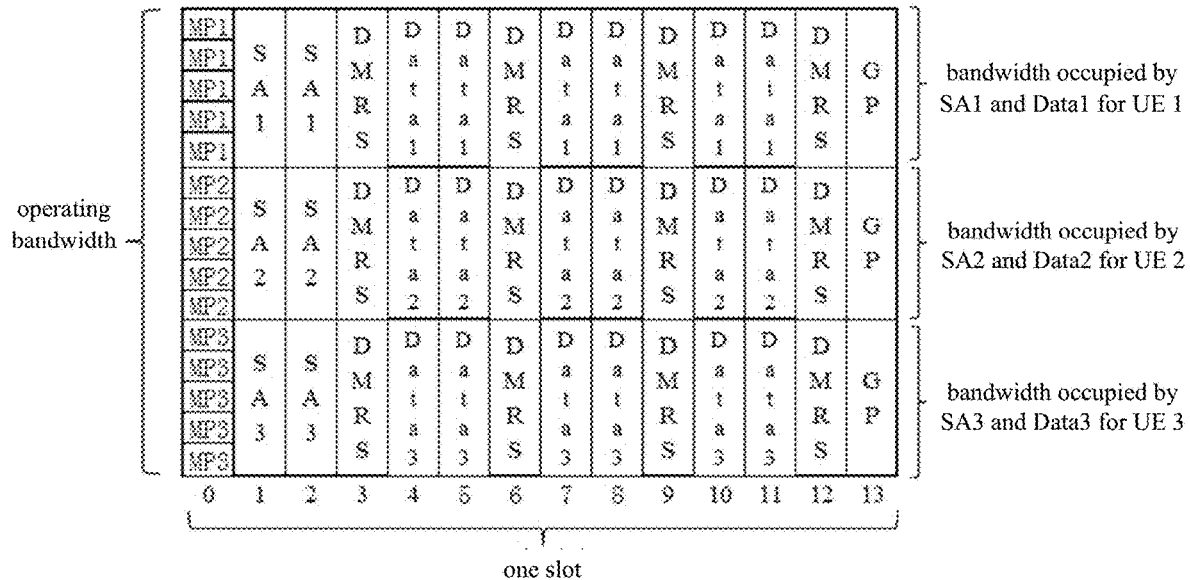
FIG. 4 is a schematic view showing an instance of centralized mapping of reference signals according to an embodiment of the present disclosure.

FIG. 4 shows an instance of the centralized mapping of the reference signals. The reference signal MP1 for the UE 1 is mapped to a part of the operating bandwidth consecutive in the frequency domain in the system operating bandwidth, the reference signal MP2 for the UE 2 is also mapped to a part of the operating bandwidth consecutive in the frequency domain in the system operating bandwidth, and the reference signal MP3 for the UE 3 is also mapped to a part of the operating bandwidth consecutive in the frequency domain in the system operating bandwidth. In addition, the reference signals for the UEs may occupy different positions in the bandwidth.

(5) In the embodiments of the present disclosure, the SCS for the reference signal (a first SCS) may be different from an SCS (a second SCS) for the SA or Data transmitted subsequently. Here, a size of the first SCS for the reference signal may be set in such a manner that the quantity of subcarriers in the operating bandwidth for the device transmitting the reference signal is sufficient to accommodate the first reference signal. In other words, the size of the first SCS may be set in such a manner that the quantity of subcarriers in the operating bandwidth is sufficient to accommodate the first reference signal.

For example, when the second SCS configured for the SA or Data is relatively large and the operating bandwidth for the device is relatively small, in the embodiments of the present disclosure, a small SCS may be adopted by the reference signal, so as to ensure that sufficient subcarriers are provided to accommodate the sequence of the reference signal.

For another example, when the second SCS configured for the SA or Data is relatively small and the operating bandwidth for the device is relatively large, in the embodiments of the present disclosure, a large SCS may be adopted by the reference signal, so as to ensure that the sequence of the reference signal may cover the entire operating bandwidth.

(6) In the embodiments of the present disclosure, the quantity of symbols occupied by the reference signal may be determined in accordance with the SCS for the reference signal, so as to enable the reference signal to meet the requirement on a duration desired for the AGC process, i.e., to provide a sufficient duration to perform the AGC process. Usually, the reference signal may occupy one or more symbols.

(7) In the embodiments of the present disclosure, the reference signal may be located on a first symbol within a slot where the reference signal is located. For example, when the reference signal merely occupies one symbol, it may be located on the first symbol within the slot. When the reference signal occupies a plurality of symbols, it may be located on a plurality of symbols starting from the first symbol within the timeslot.

(8) In the embodiments of the present disclosure, the reference signal may also be located on a symbol other than the first symbol within the slot where the reference signal is located. For example, when the reference signal merely occupies one symbol, it may also be located on an intermediate symbol or a last symbol within the slot where the reference signal is located, and when the reference signal occupies a plurality of symbols, it may be located on a plurality of symbols starting from an intermediate symbol within the slot.

(9) In the embodiments of the present disclosure, the reference signal may fully occupy all symbols within the slot where the reference signal is located or a part of symbols spaced apart from each other at intervals within the slot in the time domain, and it may occupy a part of the system operating bandwidth in the frequency domain. To be specific, a respective reference signal may be mapped to every N Resource Blocks (RBs), where N is an integer greater than or equal to 1.

In the embodiments of the present disclosure, the first device may perform at least two of the resource occupancy sensing process, the AGC process, the FOE process, the CSI measurement process and the channel estimation process in accordance with the first reference signal, which will be described hereinafter in details in conjunction with specific embodiments.

First Embodiment: the SCS for the reference signal may be different from the SCS for the SA or Data transmitted subsequently.

In the first embodiment, the first device may transmit the second reference signal to the second device. A third SCS may be adopted by the second reference signal, and different from a fourth SCS adopted by first SA and first Data, a size of the third SCS may be set in such a manner that the quantity of subcarriers in the operating bandwidth of the first device is sufficient to accommodate the second reference signal. The size of the third SCS may be positively correlated with the system operating bandwidth.

To be specific, the sequence of the reference signal may have a constant length, e.g., 255. However, the SCS of the reference signal may be different from the SCS of the subsequently-transmitted SA or Data, so that the reference signal may just cover the entire bandwidth.

a) When the SCS configured for the SA or Data is relatively large and the operating bandwidth is relatively small, a small SCS may be adopted by the reference signal, so that there is sufficient subcarriers to accommodate the sequence of the reference signal.

For example, when the operating bandwidth of the V2X is 5 MHz and the SCS configured for the SA or Data is 15 HKz, there may exist 25 RBs each including 12 subcarriers, so it is able to accommodate the sequence of the reference signal having a length of 255. However, when the SCS configured for the SA or Data is 30 KHz, the operating bandwidth of 5 MHz may merely have 12 RBs, so it is impossible to accommodate the sequence of the reference signal having a length of 255. At this time, a small SCS, e.g., an SCS of 15 KHz, needs to be adopted by the reference signal, so as to enable the bandwidth of 5 MHz to accommodate the sequence of the reference signal having a length of 255.

b) When the SCS configured for the SA or Data is relatively small and the operating bandwidth is relatively large, a large SCS may be adopted by the reference signal, so that the sequence of the reference signal may cover the entire bandwidth.

For example, when the operating bandwidth of the V2X is 20 MHz and the SCS configured for the SA or Data is 60 KHz, there may exist 25 RBs each including 12 subcarriers, and the sequence of the reference signal having a length of 255 may cover the entire bandwidth of 20 MHz. However, when the SCS configured for the SA or Data is 15 KHz, there may exist 100 RBs for the operating bandwidth of 20 MHz, and it is impossible for the sequence of the reference signal having a length of 255 to cover the entire bandwidth. At this time, a large SCS, e.g., an SCS of 60 KHz, needs to be adopted by the reference signal, so as to enable the sequence of the reference signal having a length of 255 to cover the entire bandwidth of 20 MHz.

It can be seen that, in the first embodiment, the size of the SCS adopted by the sequence of the reference signal may be flexibly configured, so as to be adapted to various SCSs of the SA/Data and various bandwidths. Relevant signaling may be transmitted to the device, so as to configure a specific size of the SCS for the device.

Second Embodiment: the reference signal may be used for resource occupancy sensing.

In the second embodiment, the first device may perform the resource occupancy sensing process in Step 22, i.e., determine a resource occupied by the other device in accordance with the first reference signal from the other device.

For example, the first device may acquire signal strength of the first reference signal received on each resource section of the system operating bandwidth, and determine the resource occupied by the other device in accordance with a resource section where the first reference signal whose signal strength is greater than a predetermined threshold is located.

For another example, upon the receipt of the first reference signal from the other device, the first device may determine the resource occupied by the other device in accordance with a resource position binding relationship. The resource position binding relationship may include a first resource position binding relationship between the first reference signal and the SA, and a second resource position binding relationship between the SA and the Data. To be specific, the binding relationship between the reference signal and the SA may be a binding relationship between information about a sequence ID and/or a CS information of the reference signal and a resource position of the SA. The resource position binding relationship may be preset, or configured through signaling.

For yet another example, upon the receipt of the first reference signal from the other device, the first device may acquire a first Cyclic Redundancy Check (CRC) sequence adopted by the first reference signal, determine a first resource configuration mode corresponding to the first CRC sequence in accordance with a predetermined correspondence between CRC sequences and resource configuration modes, and determine the resource occupied by the other device in accordance with the first resource configuration mode.

For still yet another example, the first device may determine a resource occupancy priority level of the other device in accordance with a sequence parameter of the first reference signal from the other device, compare the resource occupancy priority level of the other device with a resource occupancy priority level of the first device, and determine the resource occupied by the other device. There may exist a predetermined correspondence between sequence parameters and resource occupancy priority levels, and the sequence parameter may include a sequence index ID and/or a CS value. In a possible embodiment of the present disclosure, a resource may be occupied preferentially by a device with a higher resource occupancy priority level.

The following description will be given by taking a UE A at a transmitting side and a UE B at a receiving side as an example. When the reference signal is used for resource occupancy sensing process, the UE A at the transmitting side may transmit the reference signal before transmitting the SA or Data, and the reference signal may be used to help the UE B at the receiving side to perform the resource occupancy sensing.

a) Energy detection: the UE B may determine whether a resource section has been occupied in accordance with signal strength of the reference signal received on each resource section of the operating bandwidth, and determine a resource for transmitting the SA or Data subsequently.

b) Content detection mode 1: there may exist a binding relationship between the reference signal and the SA. A time/frequency resource occupancy position of the SA may be indicated through the reference signal, and a time/frequency resource occupancy position of the Data may be acquired through decoding the SA, so as to prevent a collision between SAs for the UEs and a collision between pieces of Data for the UEs.

In a possible embodiment of the present disclosure, there may exist the binding relationship between the reference signal and the SA and a binding relationship between the SA and the Data. In this way, the time/frequency resource occupancy position of the SA may be indicated through the reference signal, and the time/frequency resource occupancy position of the Data may be indicated through the SA, thereby to prevent the collision between the SAs and the collision between the pieces of Data for the UEs through the detection of the reference signal.

c) Content detection mode 2: the resource occupancy may be implicitly included in the sequence, and different resource configurations may be indicated through different CRCs. The UE B may accurately acquire the resource occupancy in accordance with the sequence.

d) Priory level or UE group judgment: the sequence IDs or CS values of the reference signals may have different priority levels, and a resource may be occupied preferentially by the sequence of the reference signal with a higher priority level.

In the second embodiment, the reference signal may be reused for the resource occupancy sensing, so as to acquire the resource occupancy for the current sidelink unicasting communication, and reduce the signaling overhead for the sensing, thereby to improve the resource utilization.

In addition, it should be appreciated that, in this embodiment, the device needs to transmit the reference signal before transmitting the SA or Data. Also, the reference signal may be transmitted after transmitting the SA or Data, which will be described subsequently.

Third Embodiment: the reference signal may be used for the AGC process.

In the third embodiment, the first device may perform the ACG process in Step 22, i.e., adjust a scaling factor of the ADC in a local signal receiver in accordance with a received signal strength of the first reference signal from the other device, so that the signal strength of the first reference signal scaled by the ADC in the local signal receiver is within a predetermined range.

In a possible embodiment of the present disclosure, the first reference signal may be switched to be in the time domain and form a plurality of repeating signals in the time domain. In this way, the first device may adjust the scaling factor of the analog-to-digital converter in the local signal receiver in accordance with received signal strength of at least one repeating signal of the first reference signal, and perform at least one of the resource occupancy sensing process, the FOE process, the CSI measurement process and the channel estimation process in accordance with the remaining repeating signals.

The following description will be given by taking the UE A at the transmitting side and the UE B at the receiving side.

Before the transmission of the SA, the UE A at the transmitting side may transmit the reference signal, and the reference signal may be used to help the UE B at the receiving side to perform the ACG process, so as to prevent the occurrence of an increase in the BER of the SA and Data received subsequently due to a too large ADC quantization error when the signal strength fluctuates too wildly.

a) When the SCS is relatively small, it is presumed that the AGC process may be performed through the reference signal occupying one or a half symbol.

For example, when SCS=15 HKz, a duration of the symbol may be 67 s. A duration for the AGC is usually fixed, about 10 s to 15 s, so the AGC process may be performed through the reference signal occupying a half symbol. When SCS=60 KHz, a duration of the symbol may be 17 s, so the AGC process may be performed through the reference signal occupying one symbol.

b) When the SCS is relatively large, the AGC process may be performed through the reference signal occupying two or more symbols.

For example, when SCS=120 KHz, a duration of the symbol may be 8 s. The duration for the AGC process is usually fixed, about 10 s to 15 s, so the AGC measurement may be performed through the reference signal occupying two symbols.

c) The reference signal of the remaining duration may be used for the other functions.

Through frequency-domain discrete mapping, the reference signals repeated in the time domain may be acquired. In this way, when a half symbol is used for the ACG process, the reference signal occupying a remaining half symbol may be used for the other functions.

Figure 5:
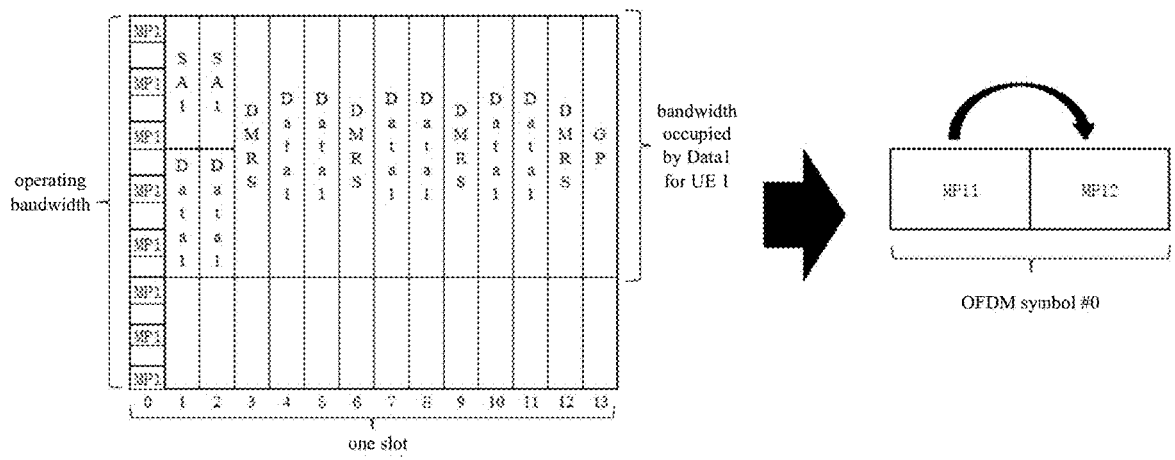
FIG. 5 is a schematic view showing the transmission of the reference signals in a distributed mapping mode according to an embodiment of the present disclosure.

As shown by a left part of FIG. 5, the reference signal is mapped by a transmitting end in the frequency domain in a comb-type mapping mode, and after the IFFT before the transmission, the reference signal may be switched from the frequency domain to the time domain. As shown by the right part in FIG. 5, one symbol is amplified. It can be seen that, the reference signal may form a signal repeated in the time domain in one symbol, and information for a first half symbol may be completely the same as information for a second half symbol. In this way, upon the receipt of the reference signal, a receiving end may perform the AGC measurement through the reference signal occupying the first half symbol, and perform the other functions, e.g., the resource occupancy sensing, through the reference signal occupying the second half symbol.

In this embodiment, during the ACG process, a duration of the reference signal may be adjusted adaptively in accordance with the configuration of the SCS, so as to adjust a gain of the ADC within a sufficient duration and prevent a waste of resources.

Fourth Embodiment: the reference signal may be used for the FOE process.

In the fourth embodiment, the reference signal may be used for the FOE process, and the following description will be given by taking the UE A at the transmitting side and the UE B at the receiving side.

The UE A at the transmitting side may transmit the reference signal before the SA or Data, and the reference signal may be used to help the UE B at the receiving side to perform the FOE. The reference signals for different UEs may be used to estimate frequency offset values for different UEs, and a specific estimation scheme will be described hereinafter.

a) Correlation processing may be performed on a receiving sequence corresponding to the first reference signal and a local sequence, the receiving signal acquired after the correlation process may be divided into a first part and a second part, and the first part may be correlated with the second part to acquire an initial frequency offset estimate.

b) Different frequency offset adjustment values may be added to the initial frequency offset estimate to acquire a plurality of frequency offset test values.

c) Phase compensation may be performed on the receiving sequence in accordance with the plurality of frequency offset test values, a correlation operation may be performed on the receiving sequence acquired after the phase compensation and the local sequence to acquire correlation peak values, and a frequency offset test value corresponding a maximum one of the correlation peak values corresponding to different frequency offset test values is taken as a final frequency offset estimate.

d) Different frequency offset compensation values may be set for different UEs using different reference signals in accordance with a maximum one of the correlation peak values detected by the UEs.

In this embodiment, the reference signal may be reused to perform the FOE process, so as to acquire the frequency offset value for the currently-transmitted data, thereby to facilitate the demodulation and decoding of the data subsequently.

Fifth Embodiment: the reference signal may be used for the CSI measurement.

In Step 22, the first device may perform the channel state measurement in accordance with the first reference signal from the other device, so as to acquire CSI. Frequency-domain resources occupied by the first reference signal from the other device may be distributed at intervals in an entirety of a system operating bandwidth, or distributed consecutively in a part of the system operating bandwidth, and the frequency-domain resources occupied by the first reference signal transmitted multiple times by the other device may cover an entirety of a system operating bandwidth.

The following description will be given by taking the UE A at the transmitting side and the UE B at the receiving side as an example.

For example, the UE A at the transmitting side may transmit the reference signal before transmitting the SA or Data, and the reference signal may be used to help the UE B at the receiving side to perform the CSI measurement.

a) The UE A may transmit a full-bandwidth reference signal. Upon the receipt of the reference signal, the UE B may acquire the CSI on the entire operating bandwidth, and select a resource with a better channel state as the resource for transmitting the data subsequently.

b) In the distributed mapping mode, the UE B may perform the CSI measurement directly using the comb-type reference signal covering the entire operating bandwidth.

c) In the centralized mapping mode, the UE A may transmit the reference signal multiple times, and the reference signal transmitted each time may cover a part of the bandwidth. Upon the receipt of the reference signals, the UE B may acquire the CSI on the entire operating bandwidth.

In this embodiment, the reference signal may be reused for the CSI measurement, so as to acquire the CSI for the current sidelink unicasting communication, and reduce the signaling overhead for a CSI-RS, thereby to improve the resource utilization.

Sixth Embodiment: the reference signal may be used for channel estimation.

In Step 22, the first device may perform the channel estimation in accordance with the first reference signal from the other device, or in accordance with the first reference signal and a DMRS from the other device.

The description will be given by taking the UE A at the transmitting side and the UE B at the receiving side as an example.

The UE A may transmit the reference signal before transmitting the SA or Data, and the reference signal may be used to help the UE B at the receiving side to perform the channel estimation.

a) When the SCS is relatively small, a duration for the AGC may be relatively small, and the reference signal may have a sufficient duration for the channel estimation. At this time, it is able to improve accuracy of the channel estimation.

b) When the SCS is relatively large, the duration for the AGC may be relatively large, and the reference signal may have an insufficient duration for the channel estimation or it is impossible to use the reference signal for the channel estimation. At this time, a DMRS needs to be newly added for the channel estimation.

In this embodiment, the reference signal may be reused to perform the channel estimation, so as to acquire an H value of a channel for the current sidelink unicasting communication, and reduce the signaling overhead for the DMRS, thereby to improve the resource utilization. In addition, the DMRS may be located before the SA or Data, and when a plurality of symbols has been occupied by the SA or Data, another DMRS needs to be inserted in the subsequent symbols.

Seventh Embodiment: the reference signal may be used for the resource occupancy sensing process, there may exist a binding relationship 1 between the SA and the Data, and a frequency-domain resource position of the SA may be the same as that of the Data.

There may exist a binding relationship between a resource position of the reference signal and a resource position of the SA, and a binding relationship between a resource position of the SA and a resource position of the Data. In this way, it is able to acquire the resource position of the SA in accordance with a specific reference signal, and acquire the resource position of the Data in accordance with the SA, thereby to prevent a collision between resources for the SA and a collision between resources for the Data.

For example, the frequency-domain resource position of the SA may be the same as the frequency-domain resource position of the Data bound to the SA, and the frequency-domain resource positions of the Data corresponding to different SAs may not overlap each other. When performing the resource occupancy sensing process in Step 22, upon the receipt of the first reference signal from the other device, the first device may determine the frequency-domain resource position of the SA for the other device in accordance with the first resource position binding relationship, and determine resources not occupied by the SA and Data for the other device in accordance with the resource position of the SA for the other device, so as to acquire resources available for the SA and Data for the first device.

Figures 6, 7:
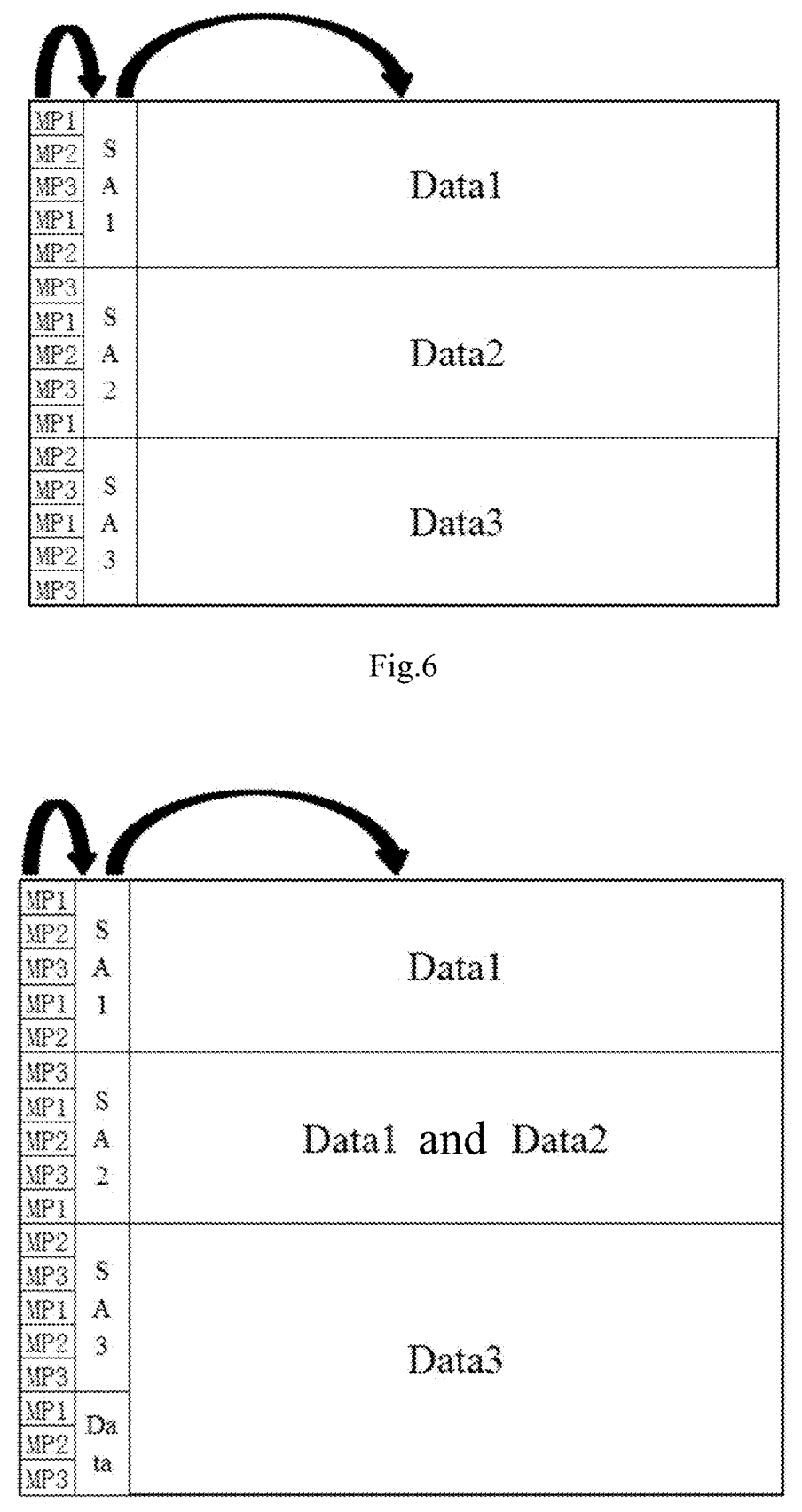

FIG. 6 is a schematic view showing the transmission of the reference signal in the centralized mapping mode. As shown in FIG. 6, the resource position of the SA may be completely the same as the resource position of the Data in the frequency domain. MP1 indicates a resource position of SA1, and SA1 indicates a resource position of Data1. Because the resource position of the SA is completely aligned with the resource position of the Data in the frequency domain and the resource positions of the Data corresponding to the SA do not overlap each other, it is unnecessary for the UE to decode the SA, and it is able to ensure that there is no collision between the resource positions of the Data as long as the SAs are different.

Here, an association and binding relationship will be described as follows: MP1 is associated with SA1, and SA1 is associated with Data1. The same relationship may also be applied to MP2 and MP3. In addition, Data1 represents a data resource occupied by UE 1, and SA1 represents a control resource occupied by the UE 1. The same may also be applied to Data2/3 and SA2/3 in this embodiment and the following embodiments.

Eighth Embodiment: the reference signal may be used to perform the resource occupancy sensing process, there may exist a binding relationship 2 between the SA and the Data, and a frequency-domain starting resource position of the SA may be the same as that of the Data.

In the eighth embodiment, a starting position of the frequency-domain resource position of the SA may be the same as a starting position of the frequency-domain resource position of the Data bound to the SA, and an ending position of the frequency-domain resource position of the SA may be the same as or different from that of the Data. In addition, the frequency-domain resource positions of the Data bound to different SAs may not overlap each other or partially overlap each other. In Step 22, upon the receipt of the first reference signal from the other device, the first device may determine the frequency-domain resource position of the SA for the other device in accordance with the first resource position binding relationship, parse the SA for the other device to acquire the resource position of the Data for the other device, determine resource position of the Data not overlapping the resource position of the Data for the other device as an available resource for the Data for the first device, and determine an available resource for the SA for the first device in accordance with the second resource position binding relationship and the available resource for the Data for the first device.

Because there is the binding relationship between the resource position of the reference signal and the resource position of the SA and the binding relationship between the resource position of the SA and the resource position of the Data, it is able to acquire the resource position of the SA through a specific reference signal, and acquire the resource position of the Data in accordance with the SA, thereby to prevent a collision between resources for the SA and a collision between resources for the Data.

As shown in FIG. 7, in this embodiment, a starting resource position of the SA may be the same as a starting resource position of the Data in the frequency domain, but an ending position of the SA may be the same as, or different form, that of the Data. In addition, the frequency-domain positions indicated by a plurality of SAs may partially overlap each other. MP1 indicates a resource position of SA1, and SA1 indicates a resource position of Data1. MP2 indicates a resource position of SA2, SA2 indicates a resource position of Data2, and Data2 belongs to a part of Data1. At this time, a UE 3 may be associated with SA1 through receiving MP1, determine that SA1 is associated with Data1 through decoding SA1, and determine that Data1 and Data2 are unavailable in accordance with a position of Data1. At this time, the UE 3 may select Data 3, and then it may be associated with SA1 through Data3. Hence, the UE 3 may finally use Data 3 and SA3, so as to prevent a resource collision between each of the SA3 and Data3 for the UE 3 and the other SA or Data.

Ninth Embodiment: the reference signal may be used to perform resource occupancy sensing process, there may exist a binding relationship 3 between the SA and the Data, and a resource for the SA may be not aligned with a resource for the Data in the frequency domain.

In the ninth embodiment, a starting position and an ending position of a frequency-domain resource position of the SA may be different from those of the Data bound to the SA, and frequency-domain resource positions of the Data bound to different SAs may not overlap each other or partially overlap each other. Similarly, in Step 22, upon the receipt of the first reference signal from the other device, the first device may determine the frequency-domain resource position of the SA for the other device in accordance with the first resource position binding relationship, parse the SA for the other device to acquire the resource position of the Data for the other device, determine a resource position of the Data not overlapping the resource position of the Data for the other device as an available resource for the data for the first device, and determine an available resource for the SA for the first device in accordance with the second resource position binding relationship and the available resource for the Data for the first device.

Because there is the binding relationship between the resource positions of the reference signal and the SA and the binding relationship between the resource positions of the SA and the Data, it is able to acquire the resource position of the SA in accordance with a specific reference signal and acquire the resource position of the Data in accordance with the SA, thereby to prevent a collision between resources for the SA and a collision between resources for the Data.

Figure 8:
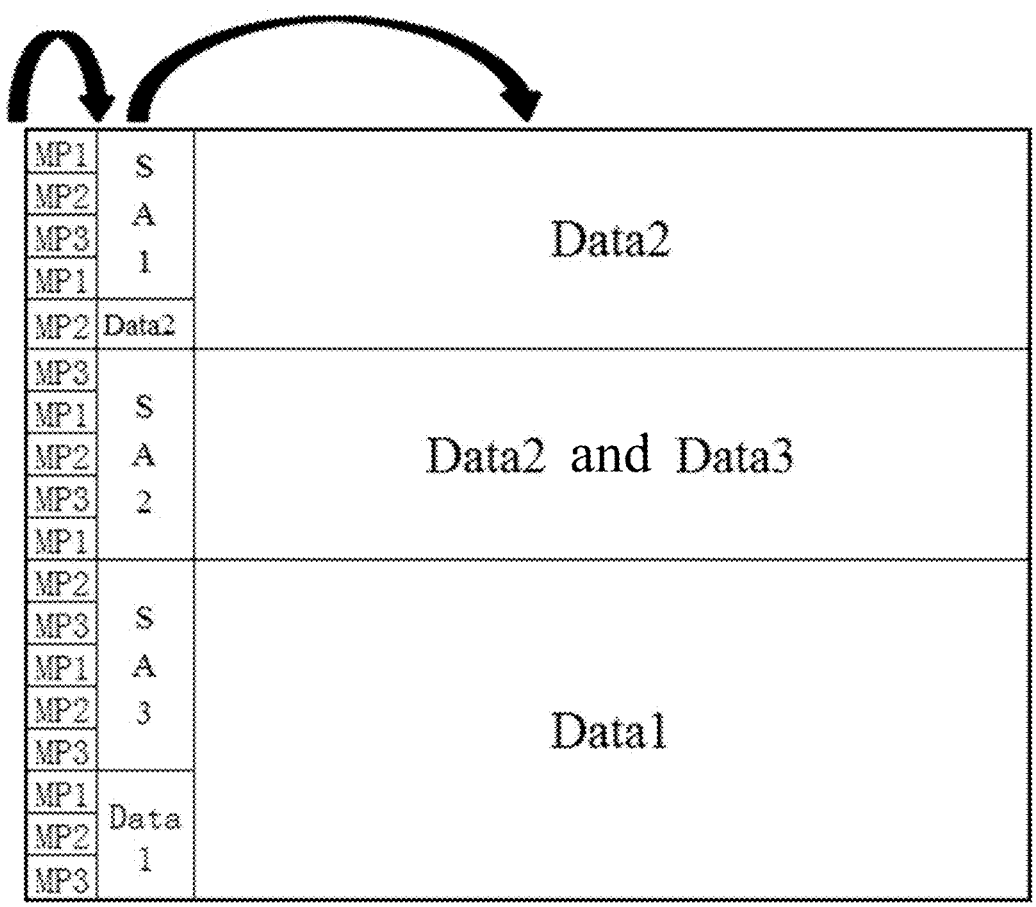
FIG. 8 is still yet another schematic view showing the transmission of the reference signals in a distributed mapping mode according to an embodiment of the present disclosure.

As shown in FIG. 8, in this embodiment, the starting resource position of the SA may not be aligned with the starting resource position and the ending resource position of the Data in the frequency domain, and the frequency-domain positions indicated by the plurality of SAs may partially overlap each other. MP1 indicates a resource position of SA1, and SA1 indicates a resource position of Data1. MP2 indicates a resource position of SA2, and SA2 indicates a resource position of Data2. MP3 indicates a resource position of SA3, SA3 indicates a resource position of Data3, and Data3 belongs to a part of Data2. At this time, the UE 3 may be associated with SA1 through receiving MP1 and then associated with Data1 through SA1, and then determine that Data2 and Data3 are available in accordance with a position of Data1. At this time, the UE 3 may select Data3, and it may be associated with SA3 through Data3. Hence, the UE 3 may finally use Data3 and SA3, so as to ensure that there is no resource collision between the SA3 or Data3 selected by the UE 3 and the other SA or Data.

Tenth Embodiment: the reference signal may not be located on a first symbol within the slot, and it may not be used to perform the AGC process.

There may exist a binding relationship between the resource positions of the reference signal and the SA and a binding relationship between the resource positions of the SA and the Data. In this way, it is able to acquire the resource position of the SA in accordance with a specific reference signal and acquire the resource position of the Data in accordance with the SA, thereby to prevent a collision between resources for the SA and a collision between resources for the Data.

Here, the reference signal may not be located on the first symbol within the slot where the reference signal is located, and instead, it may be located at an intermediate position within the slot, so it is able to accurately estimate the frequency offset through the reference signal.

Figure 9:
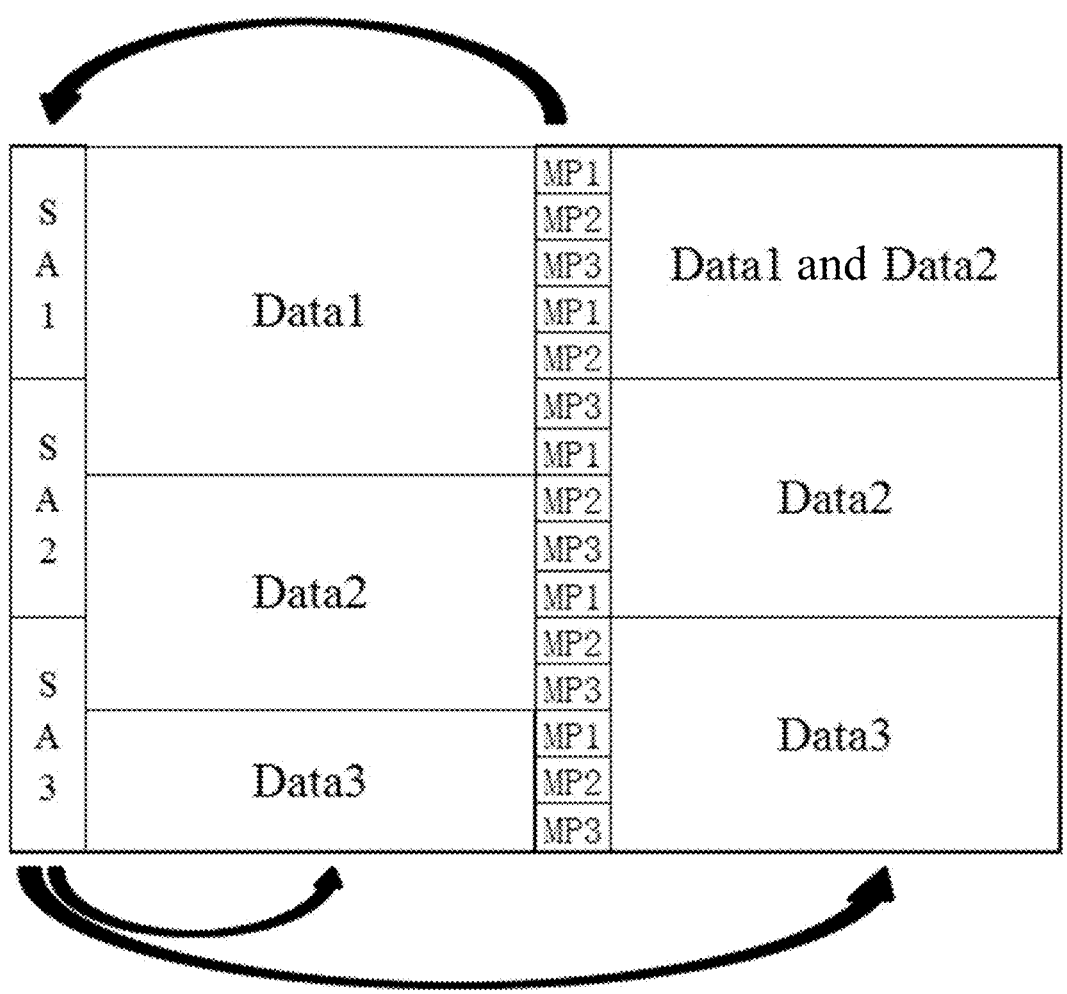
FIG. 9 is a schematic view showing the transmission of the reference signals in a centralized mapping mode according to an embodiment of the present disclosure.

As shown in FIG. 9, in this embodiment, the starting resource position of the SA may not be aligned with the starting resource position and the ending resource position of the Data in the frequency domain, and the frequency-domain positions indicated by the plurality of SAs may partially overlap each other. MP1 indicates a resource position of SA1, and SA1 indicates a resource position of Data1. MP2 indicates a resource position of SA2, and SA2 indicates a resource position of Data2. MP3 indicates a resource position of SA3, SA3 indicates a resource position of Data3, and Data1 and Data2 overlap each other. At this time, the UE 3 may be associated with SA1 through receiving MP1 and then associated with Data1 through SA1, and then determine that Data3 is available in accordance with a position of Data1. At this time, the UE 3 may select Data3, and it may be associated with SA3 through Data3. Hence, the UE 3 may finally use Data3 and SA3, so as to ensure that there is no resource collision between the SA3 or Data3 selected by the UE 3 and the other SA or Data.

Eleventh Embodiment: the reference signal may occupy a plurality of symbols rather than one symbol.

There may exist a binding relationship between the resource positions of the reference signal and the SA and a binding relationship between the resource positions of the SA and the Data, so it is able to acquire the resource position of the SA in accordance with a specific reference signal and acquire the resource position of the Data in accordance with the SA, thereby to prevent a collision between resources for the SA and a collision between resources for the Data.

Here, the reference signal may be located on a plurality of symbols within one slot rather than the first symbol of the slot, so as to accurately estimate the frequency offset through the reference signal.

Figure 10:
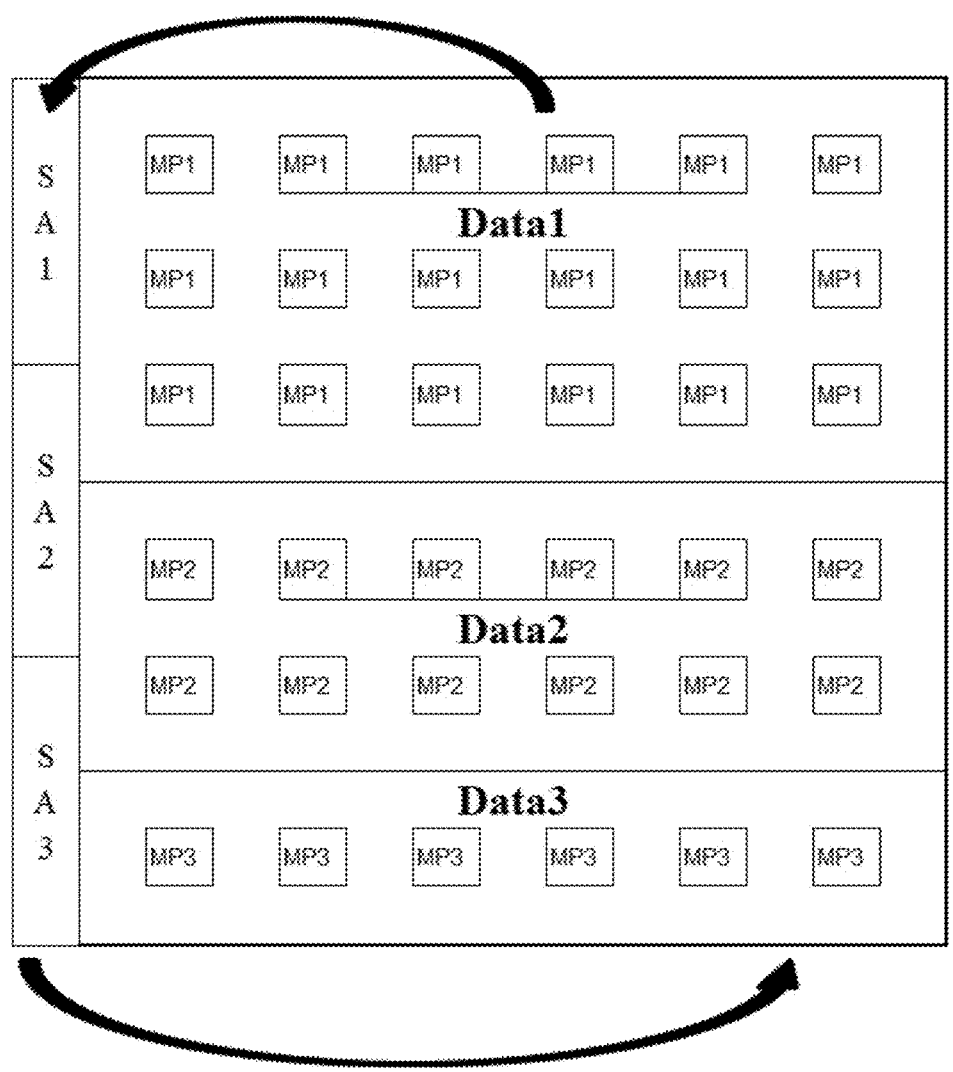
FIG. 10 is another schematic view showing the transmission of the reference signals in a centralized mapping mode according to an embodiment of the present disclosure.

To be specific, the reference signal may occupy all symbols in the time domain, or as shown in FIG. 10, a respective one reference signal may occupy every other symbol. The reference signals may be sparse in the frequency domain, and a respective one reference signal may be located on each RB or on every multiple RBs. The larger the density of the reference signals, the more accurate the frequency offset estimation, and the larger the resource overhead.

As shown in FIG. 10, in this embodiment, the starting resource position of the SA may not be aligned with the starting resource position and the ending resource position of the Data in the frequency domain. MP1 indicates a resource position of SA1, and SA1 indicates a resource position of Data1. MP2 indicates a resource position of SA2, and SA2 indicates a resource position of Data2. MP3 indicates a resource position of SA3, and SA3 indicates a resource position of Data3. At this time, the UE 3 may be associated with SA1 through receiving MP1 and then associated with Data1 through SA1, and then determine that Data3 is available in accordance with a position of Data1. At this time, the UE 3 may select Data3, and it may be associated with SA3 through Data3. Hence, the UE 3 may finally use Data3 and SA3, so as to ensure that there is no resource collision between the SA3 or Data3 selected by the UE 3 and the other SA or Data.

Based on the above method, the present disclosure further provides in some embodiments a device for implementing the above-mentioned method.

Figure 11:
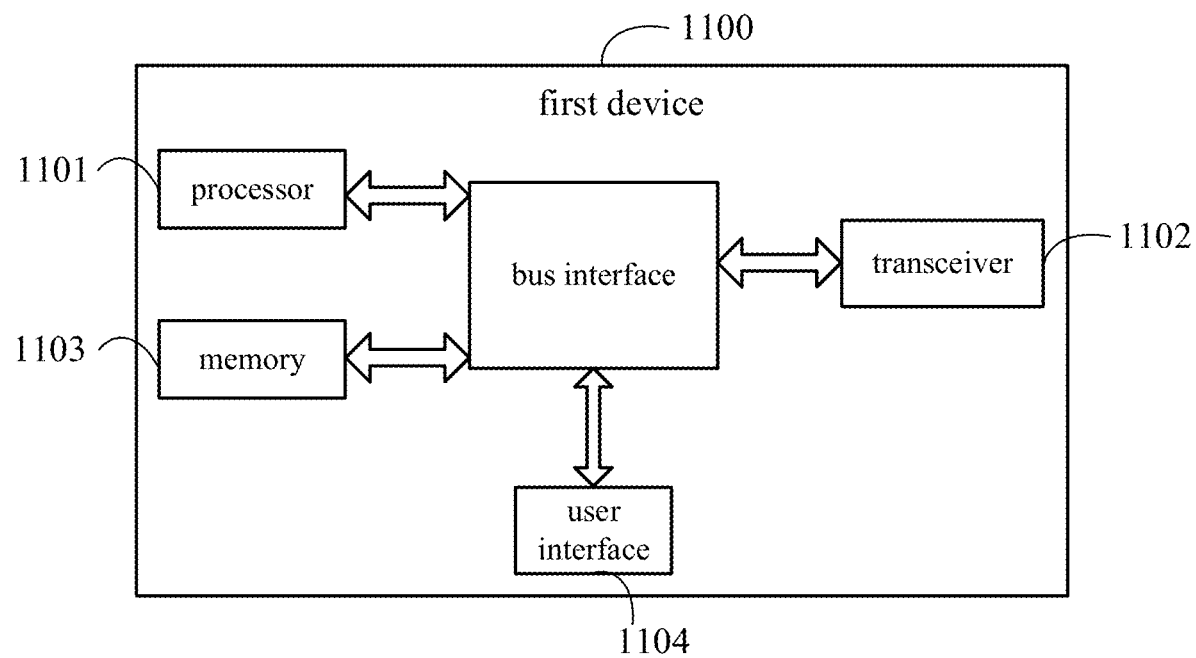
FIG. 11 is a schematic view showing a first device according to an embodiment of the present disclosure.

As shown in FIG. 11, the present disclosure provides in some embodiments a first device 1100 for a V2X system, which includes a processor 1101, a transceiver 1102, a memory 1103 and a bus interface. In the embodiments of the present disclosure, the first device 1100 may further include a computer program stored in the memory 1103 and executed by the processor 1101. The transceiver 1102 is configured to receive a first reference signal transmitted by another device via a sidelink. The processor 1101 is configured to read the computer program in the memory, so as to perform at least two of resource occupancy sensing process, AGC process, frequency offset estimation, channel state information measurement process and channel estimation process in accordance with the first reference signal from the other device.

As shown in FIG. 11, bus architecture may include a number of buses and bridges connected to each other, so as to connect various circuits for one or more processors represented by the processor 1101 and one or more memories represented by the memory 1103. In addition, as is known in the art, the bus architecture may be used to connect any other circuits, such as a circuit for a peripheral device, a circuit for a voltage stabilizer and a power management circuit. The bus interface may be provided, and the transceiver 1102 may consist of a plurality of elements, i.e., a transmitter and a receiver for communication with any other devices over a transmission medium.

The processor 1101 may take charge of managing the bus architecture as well as general processings. The memory 1103 may store therein data for the operation of the processor 1101.

In a possible embodiment of the present disclosure, the first reference signal may be an M sequence or a ZC sequence having a predetermined length, occupy an entirety or a part of a system operating bandwidth in a frequency domain, and occupy at least one symbol in a time domain.

In a possible embodiment of the present disclosure, there may exist a correspondence between signal parameters of the first reference signal and device groups or devices, the signal parameters may include a sequence adopted by the first reference signal, a CS value of the sequence and a frequency-domain position, and a same first reference signal may be reused by a plurality of devices.

In a possible embodiment of the present disclosure, the first reference signal may be mapped to an entirety of a system operating bandwidth in a comb-type mapping mode, and different devices may occupy different comb tooth positions.

In a possible embodiment of the present disclosure, the first reference signal may be mapped to consecutive BWPs in the system operating bandwidth in a consecutive mapping mode, and different devices may occupy different BWPs.

In a possible embodiment of the present disclosure, a first SCS of the first reference signal may be different from a second SCS of SA or Data transmitted subsequently by the other device, and a size of the first SCS may be set in such a manner that the quantity of subcarriers in the operating bandwidth for the other device is sufficient to meet a requirement on accommodating the first reference signal.

In a possible embodiment of the present disclosure, the quantity of symbols occupied by the first reference signal may be determined in accordance with the SCS adopted by the first reference signal, so that the first reference signal meets a requirement on a duration for the AGC process.

In a possible embodiment of the present disclosure, the first reference signal may be located on a first symbol within a slot.

In a possible embodiment of the present disclosure, the first reference signal may be located on a symbol other than the first symbol within the slot.

In a possible embodiment of the present disclosure, the first reference signal may occupy all symbols within the slot or a part of symbols at intervals within the slot in the time domain and occupy a part of the system operating bandwidth in the frequency domain, and a respective one first reference signal may be mapped to every number N of RBs, where N is an integer greater than or equal to 1.

In a possible embodiment of the present disclosure, the processor 1101 is further configured to determine a resource occupied by the other device in accordance with the first reference signal from the other device.

In a possible embodiment of the present disclosure, the processor 1101 is further configured to acquire signal strength of the first reference signal received on each resource section of the system operating bandwidth, and determine the resource occupied by the other device in accordance with a resource section where the first reference signal whose signal strength is greater than a predetermined threshold is located.

In a possible embodiment of the present disclosure, the processor 1101 is further configured to, upon the receipt of the first reference signal from the other device, determine the resource occupied by the other device in accordance with a resource position binding relationship, and the resource position binding relationship may include a first resource position binding relationship between the first reference signal and the SA and a second resource position binding relationship between the SA and the Data.

In a possible embodiment of the present disclosure, the resource position binding relationship may be preset or configured through signaling.

In a possible embodiment of the present disclosure, the processor 1101 is further configured to, upon the receipt of the first reference signal from the other device, acquire a CRC sequence adopted by the first reference signal, determine a first resource configuration mode corresponding to the first CRC sequence in accordance with a predetermined correspondence between CRC sequences and resource configuration modes, and determine the resource occupied by the other device in accordance with the first resource configuration mode.

In a possible embodiment of the present disclosure, the processor 1101 is further configured to determine a resource occupancy priority level of the other device in accordance with a sequence parameter of the first reference signal from the other device, compare the resource occupancy priority level of the other device with a resource occupancy priority level of the first device, and determine the resource occupied by the other device. There may exist a predetermined correspondence between the sequence parameter and the resource occupancy priority level, and the sequence parameter may include a sequence index ID and/or a CS value.

In a possible embodiment of the present disclosure, a frequency-domain resource position of the SA may be the same as a frequency-domain resource position of the Data bound to the SA, and frequency-domain resource positions of the Data corresponding to different SAs may not overlap each other.

In a possible embodiment of the present disclosure, the processor 1101 is further configured to, upon the receipt of the first reference signal from the other device, determine a frequency-domain resource position of the SA for the other device in accordance with the first resource position binding relationship, and determine resources not occupied by the SA and the Data for the other device in accordance with a resource position of the SA for the other device, so as to acquire an available resource for the SA and the Data for the first device.

In a possible embodiment of the present disclosure, a starting position of the frequency-domain resource position of the SA may be the same as a starting position of the frequency-domain resource position of the Data bound to the SA, an ending position of the frequency-domain resource position of the SA may be the same as or different from an ending position of the frequency-domain resource position of the Data, and the frequency-domain resource positions of the Data bound to different SAs may not overlap each other or partially overlap each other; or the starting position and the ending position of the frequency-domain resource position of the SA may be different from the starting position and the ending position of the frequency-domain resource position of the Data bound to the SA, and the frequency-domain resource positions of the Data bound to different SAs may not overlap each other or partially overlap each other.

In a possible embodiment of the present disclosure, the processor 1101 is further configured to: upon the receipt of the first reference signal from the other device, determine a frequency-domain resource position of the SA for the other device in accordance with the first resource position binding relationship, parse the SA for the other device, and acquire the resource position of the Data for the other device; and determine a resource position of the Data not overlapping the resource position of the Data for the other device as an available resource for the Data for the first device, and determine an available resource for the SA for the first device in accordance with the second resource position binding relationship and the available resource for the Data for the first device.

In a possible embodiment of the present disclosure, the processor 1101 is further configured to adjust a scaling factor of an ADC in a local signal receiver in accordance with received signal strength of the first reference signal from the other device, so that the signal strength of the first reference signal scaled by the ADC in the local signal receiver is within a predetermined range.

In a possible embodiment of the present disclosure, the first reference signal may be switched to be in the time domain and form a plurality of repeating signals in the time domain. The processor 1101 is further configured to adjust the scaling factor of the ADC in the local signal receiver in accordance with received signal strength of at least one repeating signal in the first reference signal, and perform at least one of the resource occupancy sensing process, the FOE process, the CSI measurement process and the channel estimation process in accordance with the remaining repeating signals.

In a possible embodiment of the present disclosure, the processor 1101 is further configured to perform correlation process on a receiving sequence corresponding to the first reference signal and a local sequence, divide the receiving sequence acquired after the correlation process into a first part and a second part, and correlate the first part with the second part to acquire an initial frequency offset estimate.

In a possible embodiment of the present disclosure, the processor 1101 is further configured to: add different frequency offset adjustment values to the initial frequency offset estimate to acquire a plurality of different frequency offset test values; and perform phase compensation on the receiving sequence in accordance with the plurality of different frequency offset test values, perform a correlation operation on the receiving sequence acquired after the phase compensation and the local sequence to acquire correlation peak values, and take a frequency offset test value corresponding to a maximum one of the correlation peak values corresponding to the plurality of different frequency offset test values as a final frequency offset estimate.

In a possible embodiment of the present disclosure, the processor 1101 is further configured to perform the channel state measurement in accordance with the first reference signal from the other device to acquire CSI, the frequency-domain resources occupied by the first reference signal from the other device may be distributed at intervals in an entirety of a system operating bandwidth or continuously distributed in a part of the system operating bandwidth, and the frequency-domain resources occupied by the first reference signal transmitted multiple times by the other device may cover an entirety of a system operating bandwidth.

In a possible embodiment of the present disclosure, the processor 1101 is further configured to perform the channel estimation in accordance with the first reference signal from the other device, or in accordance with the first reference signal and a DMRS from the other device.

In a possible embodiment of the present disclosure, the transceiver 1102 is further configured to transmit a second reference signal to a second device, and the second reference signal may be used by the second device to perform at least two of resource occupancy sensing process, AGC process, FOE process, CSI measurement process and channel estimation process.

In a possible embodiment of the present disclosure, the processor 1101 is further configured to, prior to transmitting the second reference signal, determine a signal parameter of the second reference signal in accordance with a device feature of the first device, the device feature may include a device ID and/or a UE group to which the device belongs, and the signal parameter may include at least one of a first sequence adopted by the first reference signal, a CS value of the first sequence, and a frequency-domain position to which the first reference signal is mapped.

In a possible embodiment of the present disclosure, the transceiver 1102 is further configured to determine a first quantity of symbols of a first type for the AGC in the second reference signal in accordance with an SCS adopted by the second reference signal, and perform frequency-domain discrete mapping process and IFFT process on a sequence of the second reference signal to acquire and transmit the second reference signal. The second reference signal may be switched from a frequency domain to a time domain after the IFFT process and form a plurality of repeating signals in the time domain, at least one repeating signal may be used by the second device for the AGC process, and the remaining repeating signals may be used by the second device to perform at least one of the resource occupancy sensing process, the FOE process, the CSI measurement process and the channel estimation process.

In a possible embodiment of the present disclosure, a third SCS adopted by the second reference signal may be different from a fourth SCS adopted by first SA and first data, a size of the third SCS may be set in such a manner that the quantity of subcarriers in the operating bandwidth for the first device is sufficient to meet a requirement on accommodating the second reference signal, and the size of the third SCS may be positively correlated with the system operating bandwidth.

Figure 12:
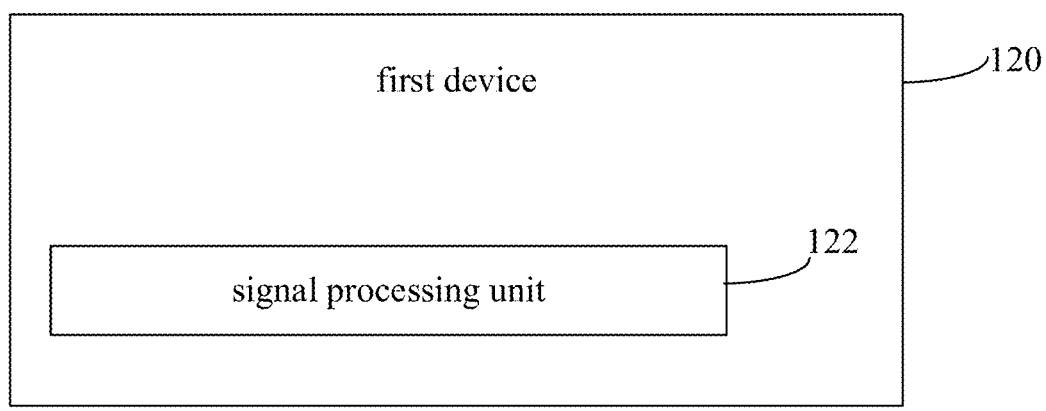
FIG. 12 is another schematic view showing the first device according to an embodiment of the present disclosure.

As shown in FIG. 12, the present disclosure further provides in some embodiments a first device 120 for a V2X system, which includes: a signal reception unit 121 configured to receive a first reference signal transmitted by another device via a sidelink; and a signal processing unit 122 configured to perform at least two of resource occupancy sensing process, AGC process, frequency offset estimation process, channel state information measurement process and channel estimation process in accordance with the first reference signal from the other device.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted by a person skilled in the art with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the prior art, may appear in the form of software products, which may be stored in a storage medium and include instructions so as to enable computer equipment (e.g., a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above are only specific embodiments of the present disclosure, but the protection scope of the present disclosure is not limited thereto. Any changes or substitutions easily conceivable by the person skilled in the art within the technical scope disclosed in the present disclosure shall fall within the protection scope of the present disclosure. Therefore, the protection scope of the present disclosure should be subject to the protection scope of the claims.

What is claimed is:

1. A reference signal transmission method for a Vehicle-to-Everything (V2X) system, comprising:
   receiving, by a first device, a first reference signal transmitted by another device via a sidelink; and
   performing, by the first device, in accordance with the first reference signal, at least two of: an Automatic Gain Control (AGC) process, a Frequency Offset Estimation (FOE) process, a Channel State Information (CSI) measurement process, a channel estimation process,
   wherein the first reference signal is located on a first symbol within a slot, a first Sub-Carrier Spacing (SCS) of the first reference signal is different from a second SCS of Scheduling Assignment (SA) or Data transmitted subsequently by the other device, and a size of the first SCS is set in such a manner that the quantity of subcarriers in the operating bandwidth for the other device is sufficient to meet a requirement on accommodating the first reference signal,
   the first reference signal is mapped to an entirety of a system operating bandwidth in a comb-type mapping mode in a frequency domain, and different devices occupy different comb tooth positions,
   the quantity of symbols occupied by the first reference signal is determined in accordance with the SCS adopted by the first reference signal.

2. The reference signal transmission method according to claim 1, wherein the first reference signal is an M sequence or a ZC sequence having a predetermined length, and is configured to occupy an entirety or a part of the system operating bandwidth in the frequency domain, and occupy at least one symbol in a time domain.

3. The reference signal transmission method according to claim 1, wherein there exists a correspondence between signal parameters of the first reference signal and device groups or devices, the signal parameters comprise a sequence adopted by the first reference signal, a Cyclic Shift (CS) value of the sequence and a frequency-domain position, and a same first reference signal is reused by a plurality of devices.

4. The reference signal transmission method according to claim 1, wherein
   the first reference signal is configured to occupy all symbols within a slot or a part of symbols at intervals within the slot in a time domain, and occupy a part of the system operating bandwidth in the frequency domain, and one first reference signal is mapped to every N Resource Blocks (RBs), where N is an integer greater than or equal to 1.

5. The reference signal transmission method according to claim 1, wherein the AGC process comprises:
adjusting a scaling factor of an Analog-to-Digital Converter (ADC) in a local signal receiver in accordance with received signal strength of the first reference signal transmitted by the other device, to enable the signal strength of the first reference signal scaled by the ADC in the local signal receiver to be within a predetermined range.

6. The reference signal transmission method according to claim 5, wherein
the first reference signal is switched to be in the time domain, to obtain a plurality of repeating signals,
wherein the adjusting the scaling factor of the ADC in the local signal receiver in accordance with the received signal strength of the first reference signal transmitted by the other device comprises: adjusting the scaling factor of the ADC in the local signal receiver in accordance with received signal strength of at least one repeating signal in the plurality of repeating signals, and performing, in accordance with a remaining repeating signal other than the at least one repeating signal in the plurality of repeating signals, at least one of: the FOE process, the CSI measurement process, the channel estimation process.

7. The reference signal transmission method according to claim 1, wherein the FOE process comprises:
performing a correlation process on a receiving sequence corresponding to the first reference signal and a local sequence, dividing the receiving sequence acquired after the correlation process into a first part and a second part;
correlating the first part with the second part to acquire an initial frequency offset estimate.

8. The reference signal transmission method according to claim 7, wherein the FOE process further comprises:
adding different frequency offset adjustment values to the initial frequency offset estimate to acquire a plurality of different frequency offset test values;
performing phase compensation on the receiving sequence in accordance with each of the plurality of different frequency offset test values, performing a correlation operation on the receiving sequence acquired after the phase compensation and the local sequence to acquire correlation peak values corresponding to the different frequency offset test values respectively, and taking a frequency offset test value corresponding to a maximum one of the correlation peak values as a final frequency offset estimate.

9. The reference signal transmission method according to claim 1, wherein the CSI measurement process comprises:
performing, by the first device, the channel state measurement in accordance with the first reference signal transmitted by the other device to acquire CSI, wherein the frequency-domain resources occupied by the first reference signal transmitted by the other device are distributed at intervals in an entirety of a system operating bandwidth or continuously distributed in a part of the system operating bandwidth, and the frequency-domain resources occupied by the first reference signal transmitted multiple times by the other device cover the entirety of the system operating bandwidth.

10. The reference signal transmission method according to claim 1, wherein the channel estimation process comprises:

performing, by the first device, the channel estimation in accordance with the first reference signal transmitted by the other device; or
performing, by the first device, the channel estimation in accordance with the first reference signal and a Demodulation Reference Signal (DMRS) transmitted by the other device.

11. The reference signal transmission method according to claim 1, wherein
a second reference signal is transmitted by the first device to a second device, wherein the second reference signal is used by the second device to perform at least two of: the AGC process, the FOE process, the CSI measurement process, the channel estimation process.

12. A non-transitory computer-readable storage medium storing therein a computer instruction, wherein when the computer instruction is executed by a computer, the reference signal transmission method according to claim 1 is implemented by the computer.

13. A first device for a Vehicle-to-Everything (V2X) system, comprising: a transceiver, a memory, a processor, and a computer program stored in the memory and executable by the processor, wherein
the transceiver is configured to receive a first reference signal transmitted by another device via a sidelink;
the processor is configured to read the computer program in the memory to: perform, in accordance with the first reference signal, at least two of: an Automatic Gain Control (AGC) process, a Frequency Offset Estimation (FOE) process, a Channel State Information (CSI) measurement process, a channel estimation process, wherein the first reference signal is located on a first symbol within a slot, a first Sub-Carrier Spacing (SCS) of the first reference signal is different from a second SCS of Scheduling Assignment (SA) or Data transmitted subsequently by the other device, and a size of the first SCS is set in such a manner that the quantity of subcarriers in the operating bandwidth for the other device is sufficient to meet a requirement on accommodating the first reference signal,
the first reference signal is mapped to an entirety of a system operating bandwidth in a comb-type mapping mode in a frequency domain, and different devices occupy different comb tooth positions,
the quantity of symbols occupied by the first reference signal is determined in accordance with the SCS adopted by the first reference signal.

14. The first device according to claim 13, wherein
the processor is further configured to adjust a scaling factor of an Analog-to-Digital Converter (ADC) in a local signal receiver in accordance with received signal strength of the first reference signal transmitted by the other device, to enable the signal strength of the first reference signal scaled by the ADC in the local signal receiver to be within a predetermined range.

15. The first device according to claim 14, wherein
the first reference signal is switched to be in the time domain, to obtain a plurality of repeating signals,
wherein the processor is further configured to adjust the scaling factor of the ADC in the local signal receiver in accordance with received signal strength of at least one repeating signal in the plurality of repeating signals, and perform, in accordance with a remaining repeating signal other than the at least one repeating signal in the plurality of repeating signals, at least one of: the FOE process, the CSI measurement process, the channel estimation process.

16. The first device according to claim 13, wherein the first reference signal is an M sequence or a ZC sequence having a predetermined length, and is configured to occupy an entirety or a part of the system operating bandwidth in the frequency domain, and occupy at least one symbol in a time domain.

17. The first device according to claim 13, wherein there exists a correspondence between signal parameters of the first reference signal and device groups or devices, the signal parameters comprise a sequence adopted by the first reference signal, a Cyclic Shift (CS) value of the sequence and a frequency-domain position, and a same first reference signal is reused by a plurality of devices.

18. The first device according to claim 13, wherein
the first reference signal is configured to occupy all symbols within a slot or a part of symbols at intervals within the slot in a time domain, and occupy a part of the system operating bandwidth in the frequency domain, and one first reference signal is mapped to every N Resource Blocks (RBs), where N is an integer greater than or equal to 1.

19. The first device according to claim 13, wherein the FOE process comprises:
performing a correlation process on a receiving sequence corresponding to the first reference signal and a local sequence, dividing the receiving sequence acquired after the correlation process into a first part and a second part;
correlating the first part with the second part to acquire an initial frequency offset estimate.

20. The first device according to claim 19, wherein the FOE process further comprises:
adding different frequency offset adjustment values to the initial frequency offset estimate to acquire a plurality of different frequency offset test values;
performing phase compensation on the receiving sequence in accordance with each of the plurality of different frequency offset test values, performing a correlation operation on the receiving sequence acquired after the phase compensation and the local sequence to acquire correlation peak values corresponding to the different frequency offset test values respectively, and taking a frequency offset test value corresponding to a maximum one of the correlation peak values as a final frequency offset estimate.

* * * * *